United States Patent [19]

Choi

[11] Patent Number: 5,612,609
[45] Date of Patent: Mar. 18, 1997

[54] CONTINUOUS CONDUCTION MODE SWITCHING POWER SUPPLY WITH IMPROVED POWER FACTOR CORRECTION

[75] Inventor: Nak-Choon Choi, Buchun, Rep. of Korea

[73] Assignee: Samsung Electronics Co., Ltd., Suwon, Rep. of Korea

[21] Appl. No.: 83,233

[22] Filed: Jun. 29, 1993

[30] Foreign Application Priority Data

Jul. 3, 1992 [KR]  Rep. of Korea ............... 92-11866

[51] Int. Cl.$^6$ ........................... G05F 1/70
[52] U.S. Cl. .................. 323/210; 323/222; 323/285; 363/89
[58] Field of Search ................... 323/210, 222, 323/282, 285, 287, 299; 363/80, 89, 81

[56] References Cited

U.S. PATENT DOCUMENTS 4,683,529  7/1987  Bucher, II ............. 323/222 X
5,003,454  3/1991  Bruning ..................... 363/81

Primary Examiner—A. D. Pellinen
Assistant Examiner—Y. Jessica Han
Attorney, Agent, or Firm—Robert A. Westerlund; Stephen R. Whitt; Charles R. Donohoe

[57] ABSTRACT

A power factor correction circuit in which an inductor current is detected separately as a charging current indication signal and a discharging current indication signal by using a current sense resistor and a current sense circuit. A scaled-down output DC voltage is compared with a predetermined reference DC voltage by using an error amplifier which serves to produce an output voltage error signal. The output voltage error signal is then multiplied with a divided-down rectified input line voltage through the use of the multiplier to generate a sinusoidal reference signal. The sinusoidal reference signal is used by peak and valley comparators which also receive the charging and the discharging current indication signals. The outputs from the peak and the valley comparators are used to control a FET transistor which controls the input line current. As a result, the power factor correction circuit is capable of effectively eliminating a dead time and thereby achieving a near unity power factor.

1 Claim, 5 Drawing Sheets

CONTINUOUS CONDUCTION MODE SWITCHING POWER SUPPLY WITH IMPROVED POWER FACTOR CORRECTION

FIELD OF THE INVENTION

The present invention relates to a power factor correction circuit for use with an AC-to-DC converter; and, more particularly, to an improved power factor correction circuit for achieving a close to unity power factor with respect to an input variation to the AC-to-DC converter in an efficient and cost-effective manner.

DESCRIPTION OF THE PRIOR ART

Active power factor correction devices have become a common feature of increasing demand in such off-line industrial equipment as AC-to-DC converters. An AC-to-DC converter is typically employed in a lamp housing, switch-mode power supply apparatus and the like; and generally consists of a full-wave rectifier followed by a bulk capacitor so as to store and deliver energy to a load.

"Power factor", as used herein, is defined as the ratio of an input power in watts(actual power) over the power(Vrms×Irms) measured with a rms voltmeter and ammeter(apparent power). Normally, an input current to the AC-to-DC converter is drawn in the form of narrow pulses having high peak values; and, therefore, its waveform is not sinusoidal. Such current form, therefore, not only tends to reduce the power factor but may also increase the stress on the rectifier and the capacitor, and pollute the input line with harmonics.

To achieve a high power factor and eliminate the harmonic content in the AC-to-DC converter, therefore, the line current is normally chopped to a relatively high frequency and fed to a booster circuit which typically contains a high frequency inductor and a switching device. As a result, the current that is fed to the booster circuit is effectively controlled so as to enable the averaged current to have a sinusoidal waveform of a proportionate magnitude and identical phase as that of the line voltage.

Various types of power factor correction devices for the boost type AC-to-DC converter have been proposed. For example, U.S. Pat. No. 4,683,529 issued to James D. Bucher and U.S. Pat. No. 5,008,599 issued to Richard C. Counts disclose booster converters operating in a discontinuous conduction mode which are typically employed in a low output power application and include a correction control circuit for controlling the switching device. This correction control circuit serves to turn on and off the switching device so that the peak inductor current traverses sinusoidally from zero to the peak AC line voltage while keeping the valley inductor current at zero. Although this type of converter, in terms of its manufacturing cost and complexity of the control circuit, is simpler than other types of converters, the power factor attained therein becomes lower in high power applications because of the increased swing width of ripple current running through the high frequency inductor.

U.S. Pat. No. 4,437,146 issued to Ralph P. Carpenter, U.S. Pat. No. 4,761,725 issued to Christopher P. Henze and U.S. Pat. No. 5,006,975 issued to Herman Neufeld disclose another type of booster converters operable in a continuous conduction mode, which may be preferably employed in high power applications. The correction control circuit employed in these patents serves to turn on and off the switching device so that the inductor current is switched to follow predetermined peak and valley current levels which track the sinusoidal wave shape of the line voltage. Although these converters provide a power factor closer to unity than the booster converters operating in a discontinuous conduction mode, there are several drawbacks. For instance, because the peak and valley values of the inductor current are controlled by two reference signals, one of which is level-shifted from the other, when the input current is increased, so does the "dead time" appearing near the valley level of the rectified input line voltage, thereby reducing the power factor. Moreover, the configuration designed to produce two reference signals tends to increase the complexity of the correction control circuit which may, in turn, entail an increased manufacturing cost thereof.

SUMMARY OF THE INVENTION

It is therefore a primary object of the invention to provide an improved power factor correction circuit capable of achieving a close to unity power factor while operating in a wide range of input by reducing the "dead time" appearing near the valley level of the rectified input line voltage in an efficient and cost-effective manner.

In accordance with the invention, a power factor control circuit for use in AC-to-DC converters is adapted to automatically control the input current drawn from a power line so as to maintain the average input current in phase with and magnitudinally proportional to the voltage on the power line. This circuit makes use of a boost technique which alternately charges and discharges the current in an inductor so as to insure a high power factor under various changing line and load conditions. The improved control circuit, capable of achieving the automatic control with high power factor, comprises: an input terminal for receiving a divided-down rectified AC signal; a voltage sensor for generating an output voltage error signal corresponding to a deviation in the output voltage of the AC-to-DC converter from a predetermined reference voltage; means for combining the divided-down rectified signal with the output voltage error signal to generate a sinusoidal reference signal; a first current sensor for generating a first current indication signal indicative of a current charging the high frequency inductor; a second current sensor for producing a second current indication signal indicative of a current discharging from the high frequency inductor; current control means adapted to receive the sinusoidal reference signal, the first and the second current indication signals for controlling the switching device and thereby approximating the shape of the current running through the high frequency inductor to the sinusoidal waveform of the rectified input voltage.

BRIEF DESCRIPTION OF THE DRAWINGS

The above and other objects and features of the instant invention will become apparent from the following description of the preferred embodiments taken in conjunction with the accompanying drawings, in which.

DETAILED DESCRIPTION OF THE PREFERRED EMBODIMENTS

Figure 1:
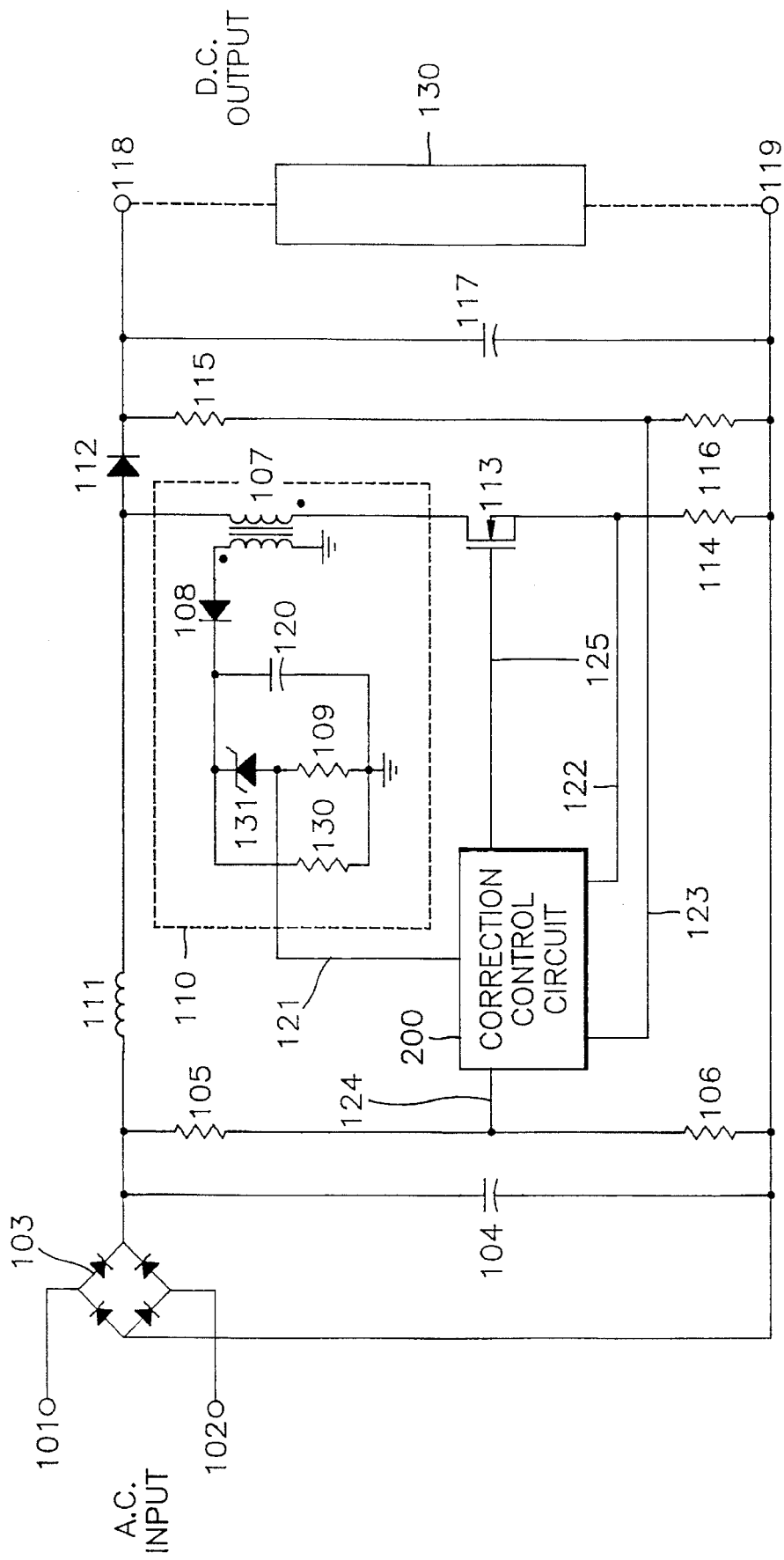
FIG. 1 represents a schematic diagram of a typical AC-to-DC converter which incorporates the present invention.

An AC-to-DC converter having a power factor correction circuit in accordance with the present invention is shown in FIG. 1. The AC-to-DC converter comprises a bridge rectifier 103, a bulk capacitor 117, a high-frequency inductor 111, a rectifying diode 112 and a switching FET transistor 113.

An AC input current on lines 101 and 102 is rectified through the bridge rectifier 103 and supplied to the inductor 111. The voltage of the AC input power is typically 110 volts or 220 volts. The switching FET transistor 113 and the inductor 111 form a high-frequency boost converter. Energy stored in the inductor 111 is discharged through the rectifier diode 112 and the storage capacitor 117 to the load 130 attached to the DC output on lines 118 and 119. The storage capacitor 117 may be a large electrolytic bulk storage capacitor used to filter and store the DC output voltage.

As depicted in FIG. 1, the AC-to-DC converter further comprises a voltage divider consisting of resistors 105 and 106, a filter capacitor 104, a voltage divider consisting of resistors 115 and 116, a current sensing resistor 114, a current sensing circuit 110, and a correction control circuit 200.

The filter capacitor 104, which has a relatively small capacity compared with the bulk capacitor 117, is connected across the output of the bridge rectifier 103; and is used to bypass the AC line so that high frequency ripples from showing up on the rectified AC input line are impeded or prevented.

The voltage divider consisting of the resistors 105 and 106 is also coupled across the output of the bridge rectifier 103, and serves to divide down the rectified input voltage so as to generate a divided-down rectified signal on line 124. This divided-down rectified signal is directly proportional in magnitude to the rectified input voltage.

The voltage divider consisting of the resistors 115 and 116 is connected across the output lines 118 and 119, and serves to scale down the DC output voltage developed across the lines 118 and 119 and produce a scaled-down DC output voltage on line 123.

The current sensing resistor 114 is coupled between the source of the switching FET transistor 113 and the return line 119, and serves to generate a first inductor current sense signal on line 122. The first inductor current sense signal is a voltage drop across the resistor 114 which has a waveform identical to that of the current charging the inductor 111 when the switching FET transistor is ON.

The current sensing circuit 110 includes a flyback transformer 107, a diode 108, a capacitor 120, resistors 109 and 132, and a zener diode 131. The transformer 107 has a primary and a secondary windings. One terminal of the primary winding is coupled between the inductor 111 and the anode of the diode 112; and the other terminal thereof is connected to the drain of the switching FET transistor 113. While one terminal of the secondary winding is connected to the ground, the other terminal thereof is coupled to the anode of the diode 108. The resistor 132, the capacitor 120, and a series connection of the zener diode 131 and the resistor 109 are coupled between the cathode of the diode 108 and the ground. The resistor 109 serves as an output terminal of the current sensing circuit 110. The capacitor 120 serves to absorb high frequency components contained in the current sensed by the flyback transformer 107.

The current sensing circuit 110 serves to detect a current discharging from the inductor 111 when the switching FET transistor is OFF; and to produce a second inductor current sense signal on line 121. The current sensing circuit 110 accomplishes this function by sensing a voltage drop across the resistor 109 which receives the current through the flyback transformer 107 and the forward biased diode 108. The waveform of the voltage drop across the resistor 109 is substantially identical to that of the current discharging from the inductor 111 when the switching FET transistor 113 is OFF.

The present invention symbolically embodied in a box labelled as the correction control circuit 200 in FIG. 1 serves to control the switching of the current running through the inductor 111 by means of the switching FET transistor 113.

The correction control circuit 200 receives feed back signals through the various lines 121, 122, 123 and 124 shown in FIG. 1. Line 123 represents a scaled-down DC voltage sense wire attached to the voltage divider networks 115 and 116; and receives a scaled-down DC voltage. Feedback line 121 represents a second inductor current sense wire coupled to the current sensing circuit 110; and receives a second inductor current sense signal from the current sensing circuit 110. Feedback line 122 serves to sense a first inductor current sense signal by sensing the voltage drop across the resistor 114. Line 124 serves to sense a divided-down rectified signal from the bridge rectifier 103 by sensing the output voltage from the voltage divider consisting of the resistors 105 and 106. Additional lines may be attached to the correction control circuit 200 as a DC return line which may also be used as a common or ground conductor for the DC bias supply which serves to power the integrated circuit and discrete components thereof.

Line 125 is a clock or FET drive control line which drives the gate of the n-type MOSFET transistor 113 shown in FIG. 1. The drain of the switching FET transistor 113 is attached to the inductor 111 and the anode of the diode 112 through the primary winding of the flyback transformer 107. The source of the switching FET transistor 113 is connected to the current sensing line 122 and the current sense resistor 124. The switching FET transistor 113 functions to alternately open and short circuit the inductor 111 to the ground or return line 119. It may be possible to use bipolar transistors in place of the switching FET transistor 113; and other semiconductor switches such as SCR's or Triacs could also be used.

When the switching FET transistor 113 is ON, the inductor 111 is effectively connected across the bridge rectifier 103 and becomes charged with current. In this condition, the switching FET transistor 113 is energized by a FET control signal on the gate line 125, discussed below. When the switching FET transistor 113 is OFF, the inductor 111 is effectively open circuited from the return line 119 and is allowed to dump its stored energy through the diode 112 and the bulk capacitor 117 into the load 130.

In accordance with the present invention, the current sensing circuit 110 and the current sensing resistor 114 function to separately detect the first and the second inductor current sense signals; and the correction control circuit 200 effectively senses various current and voltage changes occurring within the converter shown in FIG. 1, to thereby produce a clock or FET drive signal on the line 125 and control the switching of the inductor 111 by means of the FET transistor 113.

Figure 2:
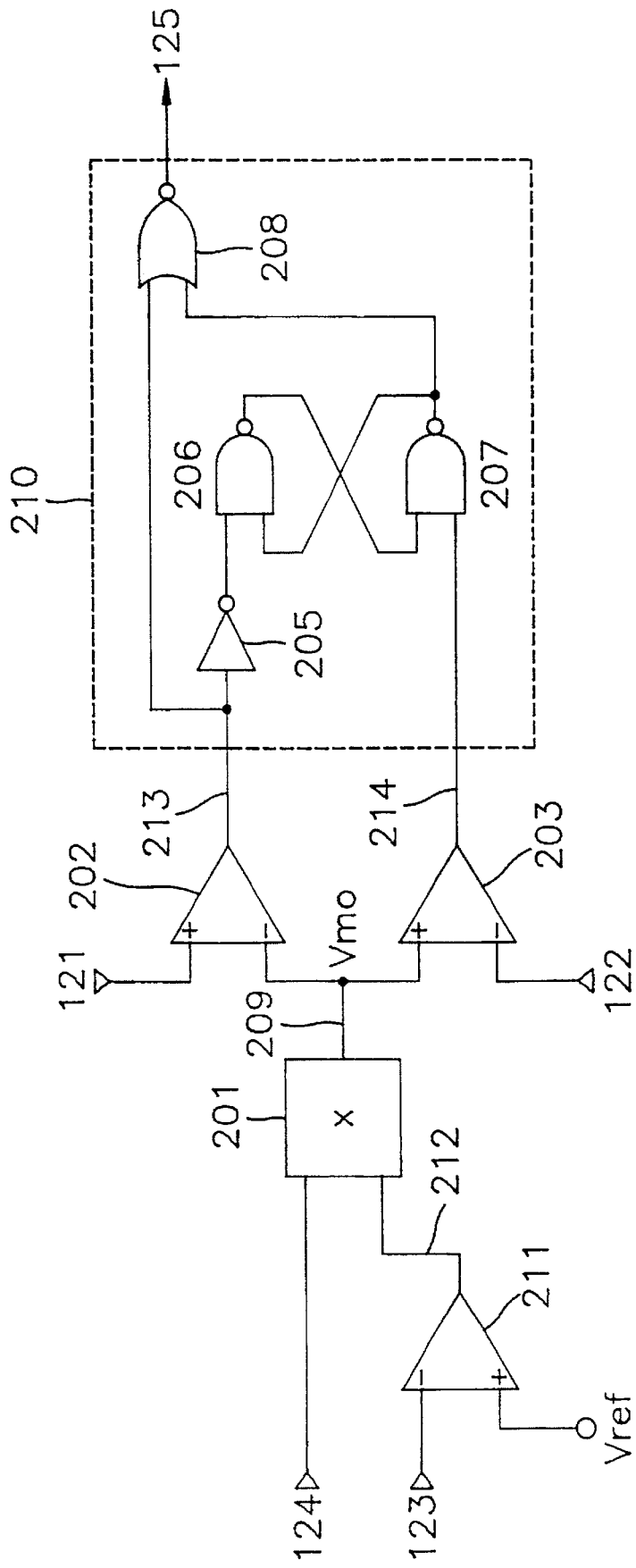
FIG. 2 provides a schematic diagram of the power factor correction control circuit of the present invention.

The correction control circuit 200, best shown in FIG. 2, includes an error amplifier 211, a multiplier 201, a peak comparator 203, a valley comparator 202 and a latch circuit 210.

The inverting input of the error amplifier 211 is connected to the line 123 while the non-inverting input thereof is coupled to a predetermined reference voltage source. The predetermined reference voltage Vref may be determined by the system designer in proportion to a desired DC output voltage. As described above, the scaled-down DC output voltage on line 123 is received from the voltage divider consisting of the resistors 115 and 116. The scaled-down DC output voltage is then received on the inverting input of the error amplifier 211. The DC reference voltage Vref is applied to the non-inverting input of the error amplifier 211. This fixed reference voltage Vref is compared, by means of the error amplifier 211, with the scaled-down DC output voltage so that the output voltage error signal from the error amplifier 211 becomes inversely proportional to the deviation or difference between the non-inverting and the inverting inputs thereof. The output voltage error signal from the error amplifier 211 is then coupled to a multiplier 201.

One input terminal of the multiplier 201 is connected to the line 124; and the other input terminal thereof is linked to the output(i.e., the output voltage error signal) of the error amplifier 211. The multiplier 201 serves to multiply the output voltage error signal with the divided-down rectified signal on line 124 and to produce a sinusoidal reference signal Vmo. The amplitude of the sinusoidal reference signal Vmo varies with the error voltage signal which serves to regulate the voltage of the output from the AC-to-DC converter closely to a predetermined DC level. As a result, the amplitude of the sinusoidal reference signal also varies in an inverse proportion to the divided-down rectified signal. The sinusoidal reference signal Vmo is simultaneously coupled to the inverting input of the valley comparator 202 and the non-inverting input of the peak comparator 203. The non-inverting input of the valley comparator 202 is attached to line 121. The valley comparator 202 serves to compare the second inductor current sense signal on line 121 with the sinusoidal reference signal and to produce a logic "H" level signal when the voltage on line 121 exceeds the sinusoidal reference signal Vmo. The logic signal of the valley comparator 202 serves to determine the valley level of the ripple current running through the inductor 111 shown in FIG. 1.

The inverting input to the peak comparator 203 is connected to line 122. The peak comparator 203 serves to compare the first inductor current Sense signal on line 122 with the sinusoidal reference voltage Vmo; and to generate a logic "H" level signal when the sinusoidal reference signal Vmo exceeds the first inductor current sense signal. The logic signal of the peak comparator 203 serves to determine the peak level of the ripple current running through the inductor 111.

This configuration of feeding the same sinusoidal reference signal Vmo on line 209 into the inverting input of the peak comparator 203 and the non-inverting input of the valley comparator 202 enables the band of the peak-valley values of the ripple current running through the inductor 111 to approximately track the sinusoidal wave shape of the line voltage and to effectively eliminate the "dead time".(As used herein, the "dead time" is intended to mean a time interval wherein the inductor current remains close to zero near the valley level of the rectified input voltage when the AC input voltage is increased.) As a result, the present invention achieves a close to unity power factor.

The logic signals from the comparators 202 and 203 are coupled to the latch circuit 210 which serves to combine the logic signals and to generate a FET control signal on line 125 which effectively controls the FET transistor 113. The latch circuit 210 includes an inverter 205, NAND gates 206 and 207, and an NOR gate 208.

The output from the latch circuit 210 is tied to the gate of the FET transistor as a logical function between the signals appearing on lines 213 and 214. The FET drive signal on line 125 is used to drive the FET transistor 113 which controls the switching of the current running through the inductor 111, As described in FIG. 2, under normal operation conditions, the signal on line 213 does not interfere with the logic signal on line 214.

TABLE 1

| logic signal of peak comparator | logic signal of valley comparator | output of latch circuit |
| --- | --- | --- |
| L | L | L |
| L | H | L |
| H | L | H |
| H | H | L |

As shown in Table 1, The FET drive signal is the only logic "H" signal when the output of the peak comparator 203 is a logic "H" signal and the output of the valley comparator 202 is a logic "L" signal. The FET drive signal is a square wave of varying duty cycle and frequency; and is used to drive the gate of the FET transistor 119. The sinusoidal reference signal Vmo determines the frequency and duty cycle of the FET drive signal on line 125, as was previously explained. The latch circuit 210 functions to vary the frequency and duty cycle of the FET control signal on line 125 to effectively generate a drive signal for the FET transistor 113, which will result in a power factor close to unity.

From the foregoing, it should be apparent that the width of an on-time or off-time interval of the FET control signal is determined by a combination of the outputs from the valley and the peak comparators 202 and 203. The FET control signal on line 125 is also affected by varying conditions on the load and the divided-down rectified input signal, which is also sensed by the voltage divider consisting of the resistors 105 and 106.

Figure 3:
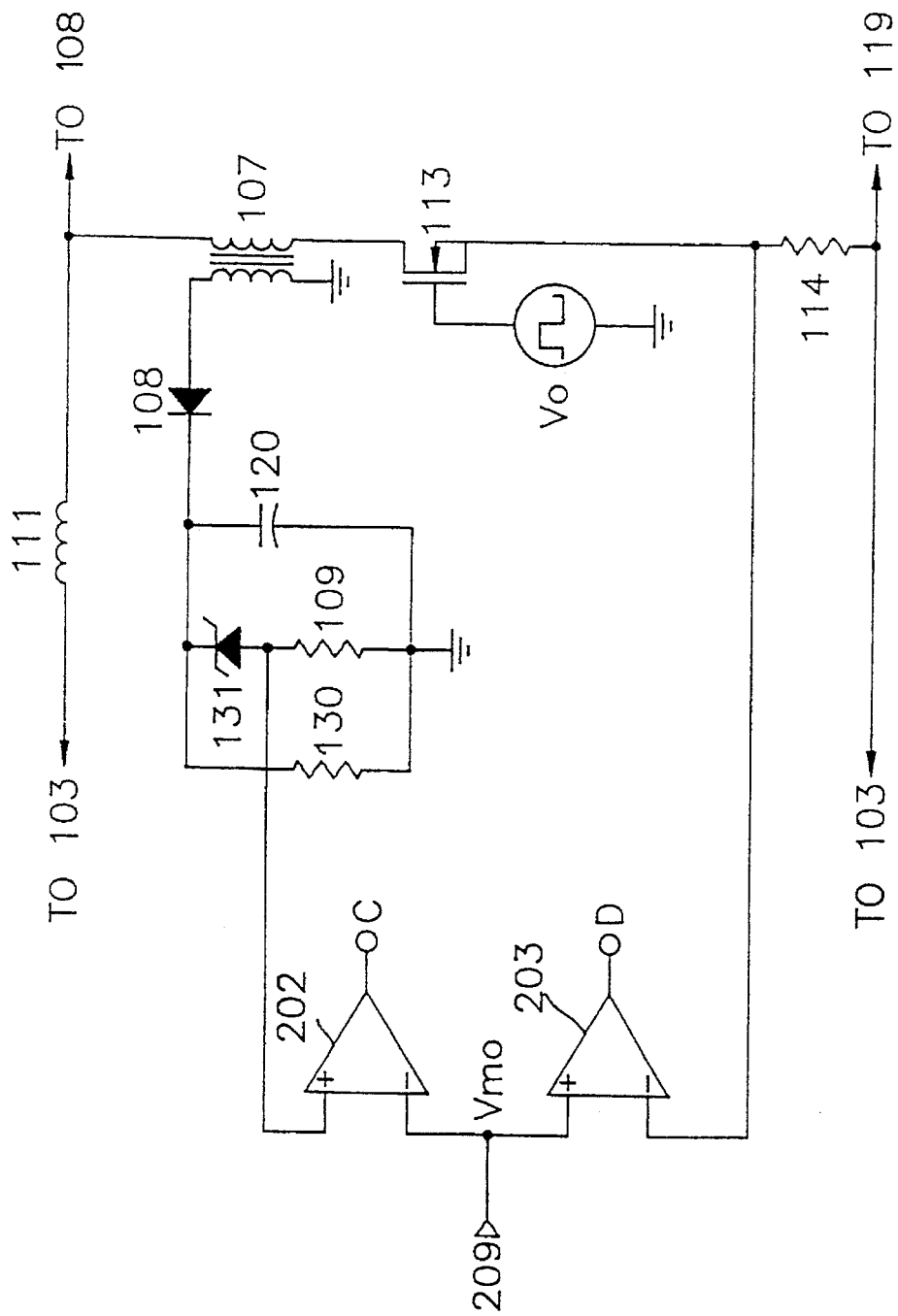
FIG. 3 offers an simplified explanatory diagram for illustrating the operation of the AC-to-DC converter shown in FIGS. 1 and 2.

Referring now to FIG. 3, a simplified AC-to-DC converter is depicted, wherein the bridge rectifier 103, the capacitors 104 and 117, the resistors 105, 106, 115, and 116, the diode 112, and the latch circuit 210(shown in FIG. 2) are removed for the sake of convenience; and it is assumed that a square wave clock generator Vo is coupled to the gate of the switching FET transistor 113. The clock generator Vo produces a clock signal having a fixed frequency as shown in FIG. 4B.

Figures 4A, 4B, 4C, 4D, 4E:
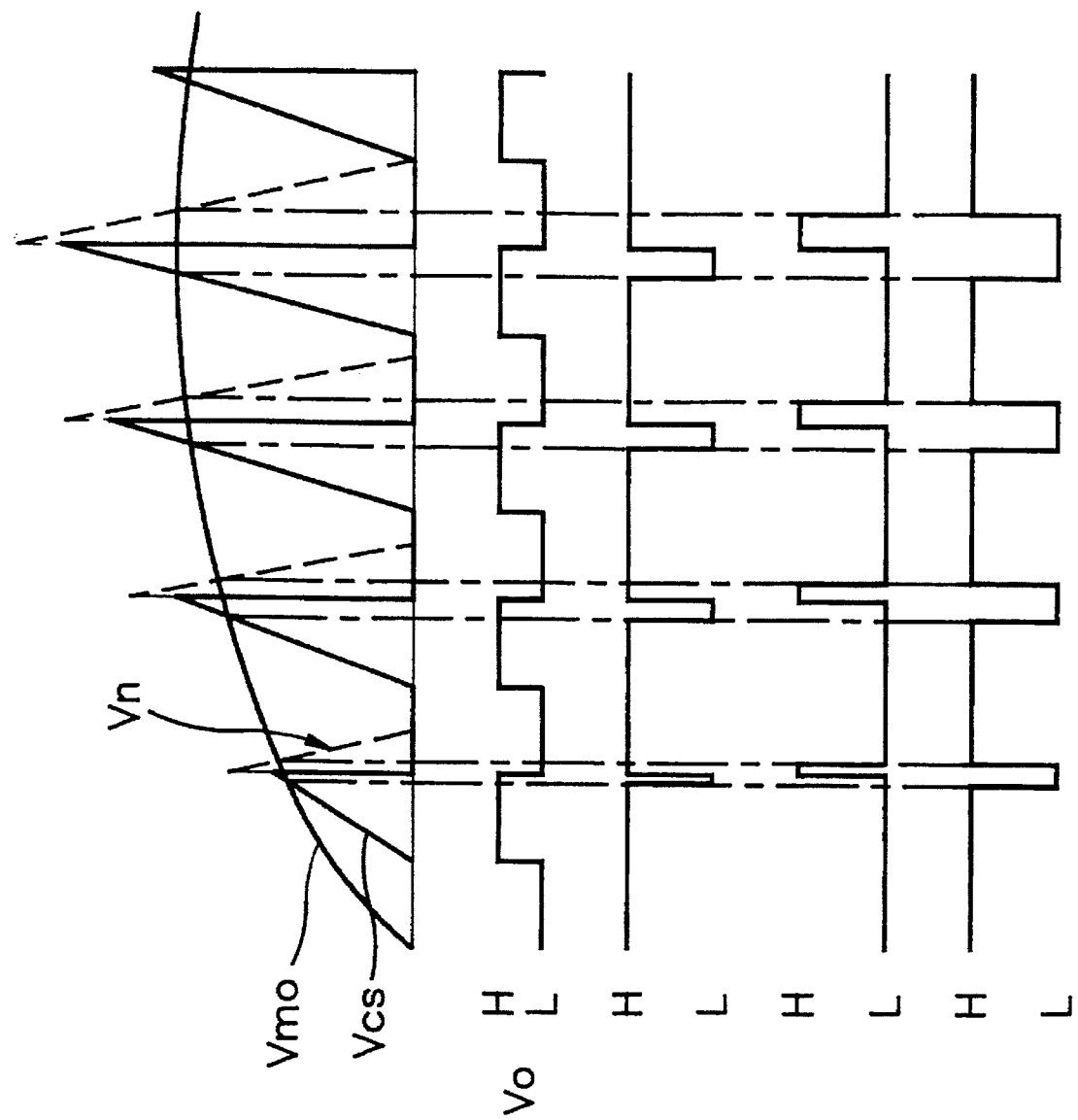
FIGS. 4A–4E show the voltage amplitudes varying as a function of time for various signals within the AC-to-DC converter of FIG. 3.

Referring now to FIG. 4A, on the top side thereof shows voltage waveforms taken from lines 121, 122, and 209 shown in FIG. 3. FIG. 4A shows the voltage waveforms when the gate of transistor 113 receives the fixed frequency clock signal from the square wave generator Vo. As was previously described in detail, the sinusoidal reference signal Vmo on line 209 shown in FIG. 4A is magnitudinally proportional to and in phase with the input line voltage. The first inductor current sense signal Vcs on line 122(solid line) indicates the current charging the inductor 111 when the switching FET transistor 113 is ON; and is compared with the sinusoidal reference voltage Vmo by means of the peak comparator 203. The second inductor current sense signal Vn on line 121(dashed line) indicates the current discharging from the inductor 111 when the switching FET transistor 113 is OFF and is compared with the sinusoidal reference signal Vmo by means of the valley comparator 202.

FIG. 4C shows the voltage taken at the output of the peak comparator 203 on line 214; and FIG. 4D depicts the voltage taken at the output of the valley comparator 202 on line 213 shown in FIG. 3. As was previously described, the outputs of the peak and the valley comparators 203 and 202 are combined by the latch circuit 210 as shown in FIG. 2. FIG. 4B indicates the FET control signal of the latch circuit 210. As may be seen from FIG. 4E, the FET control signal has a logic "H" level when the logic signal of the peak comparator 203 has a logic "H" level and the logic signal of the valley comparator 202 is of a logic "L" level.

Figure 5A:
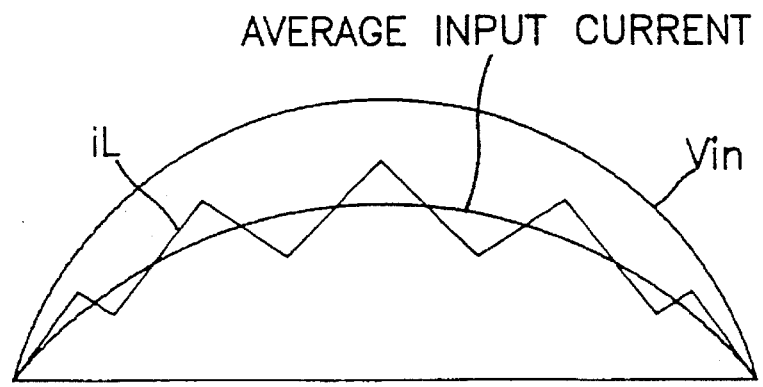
FIGS. 5A–5C depict an inductor current waveform of the AC-to-DC converter in accordance with the present invention, during a half cycle of the AC input voltage.
Figure 5B:
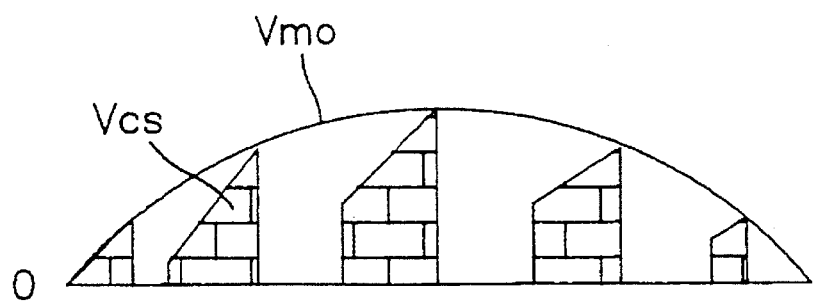
Figure 5C:
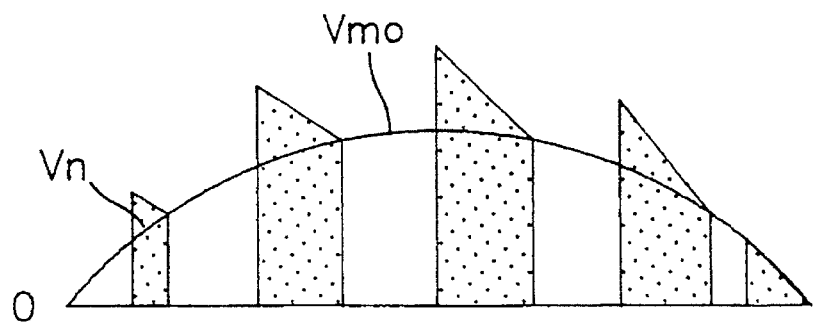

Referring to FIG. 5A on the top side thereof shows the current waveform $i_L$ taken from the inductor 111 and the voltage waveform Vin taken from the bridge rectifier 103 shown in FIG. 1, when the gate of the FET transistor 113 receives the FET control signal from the latch circuit 210 shown in FIG. 2, FIG. 5B shows the relationship between the sinusoidal reference signal Vmo and the first inductor current sense signal Vcs; while FIG. 5C depicts the relationship between the sinusoidal reference signal Vmo and the second inductor current sense signal Vn.

As may be seen from FIGS. 5A, 5B, and 5C, the sinusoidal reference signal Vmo serves to simultaneously determine the peak and the valley levels of the ripple current passing through the inductor 111 without any other level shifted reference signal. As was previously described in detail, the sinusoidal reference signal Vmo shown in FIGS. 5B and 5C is in a magnitudinal proportion to and in phase with the rectified input voltage Vin. Accordingly, as may be seen from FIG. 5A, the ripple current so controlled effectively tracks the sinusoidal wave shape of the line voltage; and the average input current to the inductor is magnitudinally proportional to and in phase with the rectified input voltage, thereby greatly reducing or eliminating the "dead time" occurring near the valley level of the rectified input voltage.

From the foregoing, it should be clear that the duty cycle of the FET control signal, i.e., chopping signal, varies with the line and load conditions of the circuit. The duty cycle also varies with the single sinusoidal reference signal which has the sinusoidal waveform identical to that of the input line voltage and serves to operate the inductor 111 in a continuous conduction mode. The foregoing variations in chopping frequency and duty cycle allow the present AC-to-DC converter to closely match the average current drawn from the power line with the line voltage in terms of both phase and magnitude.

While the present invention has been shown and described in connection with the preferred embodiments, it will be apparent to those of ordinary skill in the art that many changes and modifications may be made without departing from the spirit and scope of the invention as defined in the appended claims.

What is claimed is:

1. An improved AC-to-DC converter having a rectifier for rectifying an AC input having a sinusoidal waveform, a switching device, and an inductor connected between the rectifier and the switching device, comprising:

a first voltage divider connected to the rectifier for dividing down the rectified AC input, to thereby produce a divided-down rectified signal;

a first current sensor connected to the switching device for detecting a current charging the inductor when the inductor is in a first position wherein a rectified input current produced by the rectifier charges the inductor, and for generating a first inductor current sense signal indicative of said rectified input current which charges the inductor;

a second current sensor including a transformer connected to the inductor and to the switching device for detecting a current discharging from the inductor when the inductor is in a second position wherein said rectified input current which charges the inductor when the inductor is in said first position is discharged from the inductor, and for generating a second inductor current sense signal indicative of said charging rectified input current which is discharged from the inductor, said second current sensor further including an output terminal, a resistor coupled to said output terminal, and a diode coupled between said transformer and said resistor;

a second voltage divider connected to an output of the AC-to-DC converter for producing a divided-down output voltage;

control means connected to the switching device for alternately placing the inductor in said first position and said second position, said control means including:

an error amplifier connected to said second voltage divider for determining a deviation between said divided-down output voltage and a predetermined reference voltage, and for generating an output voltage error signal corresponding to said deviation;

a multiplier connected to said error amplifier and said first voltage divider for multiplying said divided-down rectified signal with said output voltage error signal, and for generating a sinusoidal reference signal having a waveform substantially identical to that of said divided-down rectified signal;

current control means coupled to said multiplier, said first current sensor, and said second current sensor for determining peak and valley levels of a ripple component of a current running through the inductor, and for producing a control signal to control the switching device in such a manner as to approximate the waveform of said current running through the inductor to the sinusoidal waveform of the rectified AC input, said current control means including;

a peak comparator coupled to said first current sensor and said multiplier for comparing said first inductor current sense signal with said sinusoidal reference signal, and for generating a first logic signal when the voltage of said sinusoidal reference signal exceeds that of said first inductor current sense signal;

a valley comparator coupled to said second current sensor and said multiplier for comparing said first inductor current sense signal with said sinusoidal reference signal, and for generating a second logic signal when the voltage of said sinusoidal reference signal exceeds that of said second inductor current sense signal; and, latch circuit means coupled to said peak and valley comparators for combining said first and second logic signals, and for generating said control signal.

* * * * *